3,219,588
CATALYSTS FOR THE POLYMERIZATION
OF VINYL MONOMERS
Edward M. La Combe, Charleston, James H. Ankeney, South Charleston, and Bruce R. Thompson and Andrew T. Walter, Charleston, W. Va., assignors to Union Carbide Corporation, a corporation of New York
No Drawing. Original application Apr. 21, 1960, Ser. No. 23,660. Divided and this application Oct. 30, 1963, Ser. No. 319,981
4 Claims. (Cl. 252—426)

This application is a division of application Serial No. 23,660, filed April 21, 1960. This invention relates to an improved process for polymerizing vinyl monomers.

It is known that vinyl monomers can be polymerized in the presence of compounds which yield free radicals. Such polymerizations are generally carried out in bulk, in solution, in aqueous emulsion in the presence of emulsifying agents, or in aqueous suspension.

There are many free radical polymerization initiators known to the art and they can be conveniently classified as redox and non-redox systems. The non-redox types can be either organic or inorganic compounds and become active initiators by thermal homolytic scission into their radical components. Examples of this type of initiator are acyl peroxides, alkyl hydroperoxides, alkyl peroxides, peresters, azo compounds, hydrogen peroxide, potassium persulfate, etc.

Redox catalyst systems ordinarily consist of two or more components which can be organic and/or inorganic compounds. They become active initiators by reactions of the components involving single-electron transfers. Some common redox systems include potassium persulfate-sodium bisulfite, hydrogen peroxide-iron salts, and cumene hydroperoxide-ferrous salts (with or without a complexing agent). The use of redox catalysts is to be preferred over non-redox systems because polymerization rates are significantly higher which in turn means greater productivity.

The known processes tended to low polymerization rates, or high ash resins, or discolored resins. As a result the polymers were unsatisfactory for the production of fibers because the color and the ash in the resin resulted in an unattractive product having excessive color and blush.

It has now been found that vinyl monomers can be polymerized successfully by both suspension and emulsion polymerization processes to produce polymers having excellent initial color, good heat stability, and very low ash. By the processes of this invention the polymers are produced in high yields and at fast polymerization rates.

This invention is concerned with the use as a catalyst composition of a combination of peracetic acid and a water-insoluble, high molecular weight, saturated alkyl mercaptan. The alkyl mercaptans suitable for use in this invention are the normal and branched alkyl mercaptans containing 12 or more carbon atoms, preferably from about 16 to about 30 carbon atoms; and the tertiary alkyl mercaptans containing 6 or more carbon atoms, preferably from 12 to about 30 carbon atoms. The term "branched alkyl mercaptans" as used in this application excludes the tertiary alkyl mercaptans.

As previously stated, the water insoluble, high molecular weight, saturated alkyl mercaptans are effective in polymerizations when used in combination with peracetic acid. This combination is an extremely active polymerization catalyst system capable of producing a polymer having a low ash content at a high polymerization rate by the suspension or, when using a non-ionic emulsifier, by the emulsion process. The catalyst system herein disclosed is also quite specific and unique in that other peroxidic compounds cannot be substituted for the peracetic acid.

Thus it was found that substitution of hydrogen peroxide or t-butyl peroxide for the peracetic acid rendered the polymerization process inoperable, as hereinafter set forth in Example 22.

The source of peracetic acid is not critical, but can have some affect on the conversion rate. Thus anhydrous solutions of peracetic acid in an inert organic solvent, such as ethyl acetate, acetone, acetonitrile, benzene, and the like, are suitable. Also suitable are the commonly available aqueous solutions of peracetic acid, such as a solution of peracetic acid and water in admixture with acetic acid, hydrogen peroxide and a mineral acid, such as sulfuric acid or phosphoric acid. The concentration of contained peracetic acid in the solutions can be varied widely. An important factor in the catalyst system is the amount of the peracetic acid per se charged to the polymerization reaction. The main reason for using solutions of peracetic acid is a practical one, since the known instability of pure peracetic acid renders it highly dangerous to handle other than in solutions.

Among the water-insoluble, high molecular weight, saturated alkyl mercaptans which can be used are t-heptyl mercaptan, t-octyl mercaptan, t-decyl mercaptan, t-dodecyl mercaptan, t-tetradecyl mercaptan, t-hexadecyl mercaptan, t-octadecyl mercaptan, t-eicosyl mercaptan, t-pentacosyl mercaptan, t-octacosyl mercaptan, t-tricontyl mercaptan, n-dodecyl mercaptan, n-hexadecyl mercaptan, n-octadecyl mercaptan, n-docosyl mercaptan, n-hexacosyl mercaptan, and the like.

In the practice of this invention a catalytic amount, sufficient to catalyze the polymerization, of alkyl mercaptan and peracetic acid is brought into contact with the polymerizable monomers mixture. In the emulsion polymerization process, the monomer or monomers mixture is emulsified with a suitable emulsifying agent in a non-solvent liquid, generally water, and polymerization is then carried out by adding the peracetic acid and alkyl mercaptan to the emulsion and agitating the mixture. The resulting partially or completely polymerized emulsion is then coagulated and treated in the usual manner known in the art to recover the solid polymer. In the suspension polymerization process the emulsifying agent is omitted. All of the polymerization processes can be carried out in a continuous manner or in a batch-wise procedure.

For most purposes a catalytic amount of peracetic acid is sufficient. This can vary from about 0.05 percent to about 3 percent by weight, or more, based on the total weight of polymerizable monomers charged. Preferably the peracetic acid concentration is from about 0.1 percent to about 1 percent by weight based on the polymerizable monomers charged.

The concentration of water-insoluble, high molecular weight, saturated alkyl mercaptan can be varied from about 0.1 percent to about 8 percent by weight, or more, based on the total weight of polymerizable monomers charged. The preferred concentration of alkyl mercaptan is from about 0.3 percent to about 4 percent by weight; and the preferred alkyl mercaptans are the saturated tertiary alkyl mercaptans.

The molar ratio of peracetic acid to water-insoluble, high molecular weight, saturated alkyl mercaptan charged to the polymerization reaction can vary from about 10:1 or higher, to about 0.2:1 or less. The preferred molar ratio, however, is from about 2.5:1 to about 0.4:1. It has been found that as the molar ratio of peracetic acid to saturated alkyl mercaptan is increased at a constant total molar concentration of catalysts that the molecular weight of the polymer increases.

The temperature of the polymerization can vary widely and can be varied from about 5° C. up to about the boiling point of the polymerization mixture. Lower temperatures result in lower conversion rates at a constant total molar catalyst concentration; but this can be offset by increasing the total molar concentration of the catalyst charged to the polymerization mixture. Preferred temperatures are from about 25° C. to about 70° C. Temperatures below about 25° C. are not attractive for commercial practice since the polymerization rate is too slow from an economical viewpoint.

The process of this invention can be used to polymerize vinyl monomers containing the vinyl group $$CH_2=C<$$

as well as mixtures of said vinyl monomers to produce homopolymers, copolymers, terpolymers, etc. For simplification, the term "polymer" as used in this invention includes the homopolymers as well as the polymers produced by the interpolymerization of two or more polymerizable vinyl monomers; and the term "polymerization" includes the polymerization of a single monomer to produce a homopolymer as well as the polymerization of a mixture of two or more vinyl monomers to produce copolymers, terpolymers, etc. Illustrative of the vinyl monomers which can be polymerized to high molecular weight polymers are acrylic acid and its derivatives, such as acrylonitrile, methacrylonitrile, acrylamide, methacrylamide, methacrylic acid, methyl methacrylate, ethyl methacrylate, ethyl acrylate, and the like; the vinyl halides such as vinyl chloride, vinylidene chloride, and the like; the vinyl esters such as vinyl acetate, vinyl butyrate, vinyl benzoate, and the like; the vinyl ketones such as isopropenyl methyl ketone, vinyl phenyl ketone, vinyl methyl ketone, alpha-chlorovinyl methyl ketone, and the like; the vinyl thioethers such as vinyl ethyl sulfide, vinyl p-tolyl sulfide, divinyl sulfide, and the like. Other monomers or monomer mixtures which are capable of polymerization by the process of this invention are styrene, divinyl sufone, vinyl ethyl sulfone, vinyl ethyl sulfoxide, vinyl sulfonic acid, sodium vinyl sulfonate, vinyl sulfonamide, vinyl pyridine, N-vinyl pyrollidone, N-vinyl carbazole, and the like. It will be and is obvious to a person skilled in the art that the concentrations of the monomers in the polymerizable mixture can be varied from a mixture consisting entirely of one monomer to mixtures consisting of two or more monomers in which the concentration of each monomer can be varied to suit the individual's purpose.

Among the polymers that can be produced by this invention are polyacrylonitrile, poly(vinyl chloride), poly(vinyl acetate), poly(vinylidene chloride), poly-(methyl methacrylate), polystrene, poly(ethyl acrylate), polyacrylic acid, poly(isopropenyl methyl ketone), arcylonitrile/vinylidene chloride copolymer, vinyl chloride/vinylidene chloride copolymer, vinyl chloride/vinyl acetate copolymer, acrylonitrile/vinyl chloride copolymer, acrylonitrile/vinyl acetate copolymer, acrylonitrile/vinyl chloride/vinylidene chloride terpolymer, and the like.

The presence or absence of an emulsifying agent is not critical though generally the rate is faster in the presence of an emulsifying agent. As emulsifying agents the synthetic detergents such as di(2-ethylhexyl) sodium sulfo-succinate, dihexyl sodium sulfosuccinate, sodium lauryl sulfate, the alkyl benzene sodium sulfonates, sodium 2-ethylhexene sulfonate, the alkyl phenyl polyethylene glycol ethers, and the like, can be used successfully. Generally any of the well known emulsifying agents are suitable and a person skilled in the art will have no difficulty in selecting a suitable emulsifying agent.

It was quite surprising and unexpected that the process of this invention can be carried out only in the presence of the specific catalyst compositions herein disclosed, which comprise a mixture of peracetic acid and a water-insoluble, high molecular weight, saturated alkyl mercaptan. The use of peracetic acid alone in the absence of a saturated alkyl mercaptan yields little or no polymer; and the same is true of the use of saturated alkyl mercaptan alone in the absence of peracetic acid. Hydrogen peroxide and other organic peroxides when used in comibnation with the indicated high molecular weight, water-insoluble, saturated alkyl mercaptans also give little or no polymer.

When monomers of little or no solubility in water are polymerized by the process of this invention high molecular weight polymers are produced in good yield and high rate when the two components present in the catalyst composition are separately present in the two phases of the polymerization mixture. The peracetic acid, which is water-soluble, distributes itself in the aqueous phase, and the water-insoluble, high molecular weight, saturated alkyl mercaptan, which is oil-soluble, is present in the monomer phase. The polymerization reaction then apparently occurs at or very close to the interfaces between the two phases present during the polymerization. The two catalyst components apparently co-react with each other destroying their catalytic effectiveness when they are present in the same phase, and this co-reaction is apparently so much more rapid than the polymerization reaction itself that the catalyst components are destroyed and therefore cannot promote the polymerization. While this is a possible theoretical explanation of what occurs, it is not intended to be and it should not be construed as a limitation on the present invention.

The unique catalyst combination of this invention produces polymers of improved color, and the advantages in color are maintained even after heating. The color values of the polymers are obtained by making measurements on 2 percent by weight solutions of the resin in an 85-15 ethylene carbonate-propylene carbonate mixture. The blue light transmission (BLT) is determined. The "Initial" value is the percent of blue light transmission of the solution at 375 millimicrons divided by the percent of blue light transmission of the solution at 600 miillmicrons as measured on a Beckman Model B Spectrophotomer. The "Heated" value is the same measurement after the polymer solution has been heated for 16 hours at 100° C. in a sealed glass tube or flask in an oven. The higher BLT values indicate preferred polymer color.

The reduced viscosity ($I_R$) is a measure of the molecular weight of the polymer, with higher values indicating higher molecular weights. It is defined by the equation $$I_R = \frac{\frac{\Delta N}{N_0}}{C}$$

wherein $\Delta N$ is the difference between the flow time of the solution and the flow time of the solvent; $N_0$ stands for the flow time of the solvent; and C is the concentration of the polymer in solution in grams per 100 ml. of solution. The reduced viscosity measurements were made at 30° C. using dimethylformamide as solvent and a concentration of 0.2 gram of polymer per 100 ml. of solution.

The conversions to polymer are given both in percent, which is the total conversion of monomer to polymer which occurred during the entire polymerization reaction, and in rate percent/hr., which is a measure of the rate of conversion of monomer to polymer per hour. Dividing the "percent conversion" by the "rate percent/hr." will give the total reaction time, in hours, for each polymerization.

The practice of this invention allows the polymerization of vinyl monomers at lower temperatures and at unexpectedly more rapid polymerization rates. The polymers so produced have excellent color values, a minimum of inorganic residues from the catalyst components, and molecular weights within the range most desired for the production of fibers and molded or extruded articles.

In the following examples total conversion or yield was purposely held lower than necessary by stopping the polymerization reactions before completion at a predetermined fixed time. This was intentionally done so that meaningful comparisons could be made on the rate and other properties measured. The examples merely serve to illustrate the invention, and are not intended to limit the invention, for it will be obvious to those skilled in the art that many modificatoins and variations thereof can be made.

*Example 1*

A 300 ml. Pyrex polymerization bottle was charged with 100 grams of distilled water, 1.5 grams of di(2-ethylhexyl) sodium sulfosuccinate, 20 grams of acrylonitrile, 0.3 gram of a 28% solution of peracetic acid in ethyl acetate, and 1.4 grams of n-octadecyl mercaptan. The bottle was sealed and rotated (45 r.p.m.) in a thermostated bath at 50° C. for one hour. The polyacrylonitrile produced was recovered by pouring the contents of the bottle into 600 ml. of methanol, to precipitate the polymer, followed by filtration. The polyacrylonitrile was washed with methanol and dried at 50° C. in an air oven. A total conversion of 17% was realized, and the polymer had a reduced viscosity of 1.72.

*Examples 2–11*

The following polymerizations were carried out in the manner described in Example 1. In Examples 7 to 11, however, the di(2-ethylhexyl)sodium sulfonsuccinate was omitted.

*Example 12*

The polymerization was carried out and the polymer was recovered in a manner similar to that described in Example 1 using 200 grams of distilled water, 0.4 gram of di(2-ethylhexyl)sodium sulfosuccinate, 10 grams of methyl methacrylate, 0.052 gram of a 22 percent solution of peracetic acid (containing 22% peracetic acid, (containing 22% peracetic acid, 29.1% acetic acid, 31.5% water, 16% hydrogen peroxide, 1% sulfuric acid), and 0.23 gram of t-hexadecyl mercaptan. In five hours complete conversion to poly(methyl methacrylate) resulted.

*Example 13*

Ten grams of styrene was polymerized under the conditions described in Example 12. In five hours conversion to poly(styrene) was 99% completed.

*Example 14*

Ten grams of ethyl acrylate was polymerized in the manner described in Example 12, with the exception that the di(2-ethylhexyl) sodium sulfosuccinate was omitted. In four hours a 69.1% conversion to poly(ethyl acrylate) having a reduced viscosity of 1.07 was achieved. This corresponds to a conversion rate of 17.3% per hour.

*Example 15*

Twenty grams of vinyl chloride was polymerized in the manner described in Example 12 using 100 grams of distilled water, 0.2 gram of di(2-ethylhexyl)sodium sulfosuccinate, 0.026 gram of the 22% peracetic acid solution, and 0.12 gram of t-hexadecyl mercaptan. In 4.75 hours, conversion to poly(vinyl chloride) was 19% and the polymer had a reduced viscosity of 0.85. The conversion rate was 4% per hour.

*Example 16*

The following series of polymerizations was conducted at 50° C. in a thermostated bath containing a rotating (40 r.p.m.) cylindrical metal basket. The polymerization starting materials were charged to 400 ml. Pyrex polymerization bottles, purged wih vinyl chloride, and sealed with caps containing polyethylene liners. In all cases, 16 grams of acrylonitrile, 22 grams of vinyl chloride, 2 grams of vinylidene chloride, and 200 grams of water were used. The emulsifying agent was 0.9 gram of di(2-ethylhexyl)sodium sulfosuccinate, which is sold commercially under the trade-name Aerosol OT. The catalyst composition consisted of 0.3 gram of peracetic acid solution (28% solution in ethyl acetate) with the quantity of alkyl mercaptan indicated in the table. The polymer was recovered by precipitating the emulsion in 600 ml. of methanol and filtering. The polymer was then washed on the filter with methanol and water, and in the cases where n-octadecyl mercaptan and n-docosyl mercaptan were used, the polymer was reslurried with isopropanol and filtered. The washed acrylonitrile/vinyl chloride/vinylidene chloride polymer was dried at 50° C. in an air oven. It was found that increasing the size of the tertiary-alkyl radical in the alkyl mercaptan molecule generally increased the percent conversion.

| Example | 2 | 3 | 4 | 5 | 6 | 7 | 8 | 9 | 10 | 11 |
|---|---|---|---|---|---|---|---|---|---|---|
| Monomers charged, g.: | | | | | | | | | | |
| Acrylonitrile | 10 | | | | | 20 | 10 | | | 2 |
| Vinyl Chloride | | 20 | 15 | 8 | | | | 10 | | 18 |
| Vinylidene Chloride | 10 | | 5 | | | | 10 | | 20 | |
| Vinyl Acetate | | | | 12 | 20 | | | | | |
| Conversion: | | | | | | | | | | |
| Percent | 40.4 | 74.6 | 31.1 | 89.4 | 62.3 | 9.7 | 13.6 | 48.1 | 5.3 | 7.3 |
| Rate percent per Hour | 40.4 | 24.9 | 10.4 | 29.8 | 19.4 | 7.7 | 10.9 | 24.1 | 2.7 | 1.8 |
| Reduced Viscosity, $I_R$ | | 0.90 | 0.83 | 0.82 | 1.99 | 2.83 | 0.87 | 0.91 | | 1.27 |
| Acrylonitrile Content*, percent | 44 | | | | | 100 | 47 | | | 46 |
| Vinyl Chloride Content*, percent | | 100 | | 43 | | | | 100 | | |
| Vinylidene Chloride Content*, percent | | | 47 | | | | | | 100 | |
| Vinyl Acetate Content*, percent | | | | | 100 | | | | | |

* Represents monomer content of the resin.

| Mercaptan | | Conversion | | Reduced Viscosity, $I_R$ | Acrylo-nitrile, Percent * | Color BLT, Initial/ Heated |
|---|---|---|---|---|---|---|
| Type | Weight, g. | Percent | Rate Percent/Hr. | | | |
| t-$C_{12}H_{25}$SH | 0.08 | 9.67 | 7.75 | 4.00 | 64 | 97/87 |
| t-$C_{12}H_{25}$SH | .12 | 18.3 | 14.6 | 3.27 | 62 | 98/88 |
| t-$C_{12}H_{25}$SH | .16 | 18.1 | 18.1 | 2.87 | 64 | 98/88 |
| t-$C_{12}H_{25}$SH | .20 | 21.9 | 21.9 | | 64 | 98/89 |
| t-$C_{14}H_{29}$SH | .10 | 20.9 | 17.9 | | 61 | 95/83 |
| t-$C_{14}H_{29}$SH | .14 | 27.1 | 27.1 | 3.39 | 62 | 93/82 |
| t-$C_{16}H_{33}$SH | .18 | 31.4 | 31.4 | 2.74 | 63 | 97/88 |

*Represents the acrylonitrile content of the polymer.

A comparison of the above results using tertiary-alkyl mercaptans with the results obtained when normal alkyl mercaptans are employed (see table below) shows a superiority of the tertiary-alkyl mercaptans, even over normal alkyl mercaptans having larger alkyl radicals.

| Mercaptan | | Conversion | | Reduced Viscosity, $I_R$ | Acrylo-nitrile, Percent | Color BLT, Initial/ Heated |
|---|---|---|---|---|---|---|
| Type | Weight, g. | Percent | Rate Percent/Hr. | | | |
| n-$C^{16}H_{33}$SH | 0.06 | 2.1 | 0.45 | 4.3 | 65 | 94/84 |
| n-$C^{16}H_{33}$SH | .08 | 2.3 | .77 | 4.2 | 63 | 96/84 |
| n-$C^{16}H_{33}$SH | .10 | 1.9 | 1.09 | | 66 | 94/85 |
| n-$C^{16}H_{33}$SH | .12 | 5.8 | 3.3 | 4.8 | 64 | 96/88 |
| n-$C^{16}H_{33}$SH | .14 | 9.5 | 6.3 | 4.3 | 63 | 95/88 |
| n-$C^{18}H_{37}$SH | 0.12 | 12.4 | 6.2 | 4.5 | 64 | 97/88 |
| n-$C_{22}H_{45}$SH | 0.10 | 5.8 | 2.3 | 3.64 | 61 | 91/76 |
| n-$C_{22}H_{45}$SH | .20 | 9.2 | 9.2 | 4.65 | 61 | 90/65 |

It is evident from the above results that tertiary-alkyl mercaptans are preferred, that the rate of polymerization at a given concentration of tertiary-alkyl mercaptan increases as the molecular weight of the mercaptan increases, and that the rate of polymerization increases as the concentration of alkyl mercaptan is increased.

Example 17

The following series of polymerizations was carried out in the manner described in Example 16 to produce similar terpolymers. In this series the concentration of tertiary-alkyl mercaptan was kept constant by using 0.16 gram of t-hexadecyl mercaptan, but the peracetic acid concentrations and solutions thereof used were varied. Peracetic acid solution "A" was a 28% by weight solution in ethyl acetate. Peracetic acid solution "B" was a solution containing 40% peracetic acid, 39% acetic acid, 14% water, 6% hydrogen peroxide, and 1% sulfuric acid.

| Peracetic Acid | | Conversion | | Color BLT, Initial/Heated |
|---|---|---|---|---|
| Type | Weight, g. | Percent | Rate Percent/Hr. | |
| A | 0.05 | 10.9 | 5.97 | 96/85 |
| A | 0.10 | 16.2 | 10.7 | 97/87 |
| A | 0.15 | 21.1 | 14.0 | 97/88 |
| A | 0.20 | 26.1 | 20.9 | 98/88 |
| A | 0.25 | 29.2 | 23.4 | 97/88 |
| A | 0.30 | 30.3 | 30.3 | 97/88 |
| B | 0.04 | 12.0 | 9.6 | 96/85 |
| B | 0.10 | 26.5 | 21.2 | 97/87 |
| B | 0.14 | 29.7 | 29.7 | 97/87 |
| B | 0.21 | 32.0 | 32.0 | 97/87 |

The results obtained in this series illustrate the preferability of using an aqueous peracetic acid solution of Type B, containing acetic acid and hydrogen peroxide, since, in general, higher rates of polymerization are achieved with the use of such aqueous solutions at equal concentrations of real peracetic acid.

Example 18

This series of polymerizations was carried out in the manner described in Example 16 using 18 grams of vinyl chloride, 2 grams of acrylonitrile, and 100 grams of water as the charge, to produce copolymers of vinyl chloride and acrylonitrile. The emulsifying agent charged was dihexyl sodium sulfosuccinate, which is sold commercially under the trade name Aerosol MA. Peracetic acid solution "A" was a 28% by weight solution in ethyl acetate. Peracetic acid solution "B" was a solution containing 40% peracetic acid, 39% acetic acid, 14% water, 6% hydrogen peroxide, and 1% sulfuric acid.

| t-$_{16}CH_{33}$SH wt., g. | Aerosol MA wt., g. | Peracetic Acid Solution, wt. | Rate Percent/Hr. | Reduced Viscosity, $I_R$ | Acrylo-nitrile, Percent | Color, BLT, Initial/Heated |
|---|---|---|---|---|---|---|
| 0.16 | 1.20 | A, 0.30 | 6.1 | 0.89 | 41.9 | 95/77 |
| 0.20 | 1.0 | B, 0.17 | 10.3 | 0.80 | 33 | 89/63 |
| 0.23 | 1.0 | B, 0.14 | 6.8 | 0.76 | 34 | 87/63 |

Example 19

Terpolymers of acrylonitrile/vinyl chloride/vinylidene chloride were produced by emulsion polymerizations carried out in the manner described in Example 16 but using 0.9 g. of di(2-ethylhexyl) sodium sulfosuccinate as emulsifying agent when the "A" peracetic acid solution was used, and 0.4 g. when the "B" peracetic acid solution was used. In this series the ratio of tertiary-alkyl mercaptan to peracetic acid in the catalyst was varied. Peracetic acid solution "A" was a 28% by weight solution in ethyl acetate. Peracetic acid solution "B" was a solution containing 22% peracetic acid, 29.1% acetic acid, 31.5% water, 16% hydrogen peroxide, and 1% sulfuric acid. In this instant the amount of "B" solution used represents the total peroxide content, i.e., the sum total of peracetic acid and hydrogen peroxide present.

| Catalyst Moles ×10⁻³ | | Catalyst Total Moles ×10⁻³ | Conversion | | Reduced Viscosity, $I_R$ | Acrylonitrile, Percent | Color BLT, Initial/Heated |
|---|---|---|---|---|---|---|---|
| t-$C_{16}H_{33}SH$ | $CH_3CO_3H$, Type | | Percent | Rate percent/Hr. | | | |
| .326 | .821 B | 1.15 | 15.7 | 20.9 | 3.84 | 66 | 96/86 |
| .372 | .758 B | 1.13 | 5.7  | 11.3 | 3.64 | 64 | 94/80 |
| .596 | .549 B | 1.15 | 8.2  | 16.4 | 3.56 | 66 | 95/83 |
| .815 | .342 B | 1.16 | 12.0 | 16.0 | 3.36 | 65 | 95/86 |
| .869 | .274 B | 1.14 | 11.1 | 11.1 | 3.0  | 66 | 96/87 |
| .977 | .205 B | 1.18 | 7.6  | 3.78 | 2.43 | 64 | 96/87 |
| .814 | .406 A | 1.22 | 13.4 | 17.9 | 2.31 | 61 | 97/87 |
| .890 | .294 A | 1.18 | 10.2 | 10.2 | 2.24 | 59 | 97/87 |
| .969 | .221 A | 1.19 | 7.4  | 4.94 | 2.16 | 62 | 95/85 |

The results show that decreasing the ratio of peracetic acid to tertiary-hexadecyl mercaptan caused a decrease in the molecular weight, indicated by decreased viscosity, of the polymer produced at constant total catalyst content. At the same time, no adverse effect on the resin color or the composition of the polymer produced was observed.

series indicated that an increase in temperature increased the rate of conversion without any appreciable effect on the composition of the polymer produced; and, further, that increased conversion was obtained by increasing the catalyst concentration.

| t-Mixed* Mercaptans, g. | Temperature, °C. | Conversion | | Reduced Viscosity, $I_R$ | Acrylonitrile Percent | Color BLT, Initial/Heated |
|---|---|---|---|---|---|---|
| | | Percent | Rate Percent/Hr. | | | |
| .12 | 24 | 4.1  | 1.35 | 3.70 | 61 | 97/90 |
| .12 | 35 | 3.0  | 3.0  | 4.25 | 62 | 94/83 |
| .12 | 50 | 5.2  | 10.4 | 2.77 | 61 | 92/76 |
| .16 | 24 | 4.1  | 1.37 | 3.16 | 63 | 98/91 |
| .16 | 35 | 3.7  | 3.65 | 2.80 |    | 95/85 |
| .16 | 50 | 6.9  | 13.7 | 2.53 | 62 | 94/81 |
| .20 | 24 | 5.5  | 1.82 | 2.68 | 61 | 98/90 |
| .20 | 35 | 8.6  | 8.6  | 2.09 |    | 96/86 |
| .20 | 50 | 12.2 | 24.4 | 2.58 | 64 | 93/82 |
| .24 | 24 | 4.7  | 2.33 | 2.18 | 61 | 97/90 |
| .24 | 35 | 10.5 | 14.0 | 2.42 | 63 | 96/87 |
| .24 | 50 | 30.2 | 40.3 | 2.75 | 62 | 94/84 |
| .28 | 24 | 5.4  | 2.7  | 2.05 |    | 97/91 |
| .28 | 35 | 4.9  | 6.5  | 1.99 | 59 | 97/88 |
| .28 | 50 | 13.6 | 18.1 | 2.35 | 61 | 95/85 |
| .32 | 24 | 5.3  | 2.65 | 1.89 | 61 | 98/91 |
| .32 | 35 | 3.7  | 4.7  | 1.74 | 60 | 97/88 |
| .32 | 50 | 29.4 | 39.1 | 2.47 | 64 | 95/84 |

*A mixture of tertiary $C_{12}$, $C_{14}$, and $C_{16}$ mercaptans.

Example 20

Emulsion polymerizations were carried out in the manner described in Example 16 using 0.4 g. of di(2-ethylhexyl) sodium sulfosuccinate as emulsifying agent and 0.21 g. of the "B" peracetic acid solution described in Example 17. The results on the terpolymers produced in this

Example 21

Emulsion polymerizations were carried out as described in Example 16, but varying the water to total monomers ratio. The experimental conditions used for producing the terpolymers are summarized below. The emulsifier was di(2-ethylhexyl)sodium sulfosuccinate.

| Water, g | 200 | 50 | 50 | 200 | 100 | 100 | 150 | 200 | 200 | 200 |
|---|---|---|---|---|---|---|---|---|---|---|
| $CH_3COOOH$ solution | A | B | B | A | B | B | B | A | B | B |
| Grams | 0.11 | .052 | .052 | 0.11 | .052 | .052 | .052 | 0.11 | .052 | .052 |
| Emulsifier, g | 0.4 | 0.4 | 0.4 | 0.4 | 0.4 | 0.4 | 0.4 | 0.4 | 0.4 | 0.4 |
| t-Hexadecyl mercaptan, g | 0.48 | .112 | .112 | 0.48 | .112 | .112 | .112 | 0.48 | .112 | .112 |
| Monomers charged, g.: | | | | | | | | | | |
| Acrylonitrile | 16 | 7 | 4 | 8 | 7 | 4 | 7 | 4 | 7 | 4 |
| Vinyl Chloride | 22 | 3 | 6 | 11 | 3 | 6 | 3 | 5.5 | 3 | 6 |
| Vinylidene Chloride | 2 | | | 1 | | | | 0.5 | | |
| Water:Monomers Ratio | 5:1 | 5:1 | 5:1 | 10:1 | 10:1 | 10:1 | 15:1 | 20:1 | 20:1 | 20:1 |
| Conversion: | | | | | | | | | | |
| Percent | 30.2 | 71 | 39 | 34.4 | 36.3 | 19.7 | 24.3 | 28.8 | 15.5 | 24.1 |
| Rate Percent Per Hour | 24.2 | 71 | 78 | 34.4 | 36.3 | 25.9 | 16.2 | 23.1 | 3.33 | 6 |
| Reduced Viscosity, $I_R$ | 2.66 | | 1.68 | 1.37 | | 1.25 | 1.39 | 0.54 | | 0.97 |
| Acrylonitrile content, percent | 64 | 82 | 75 | 57 | 81 | 75 | 77 | 48 | 73 | 58 |
| Color BLT, Initial/Heated | | 97/89 | 96/89 | | 96/90 | 96/89 | 97/90 | | 97/87 | 92/81 |

A = 40% peracetic acid, 39% acetic acid, 14% water, 6% hydrogen peroxide, 1% sulfuric acid.
B = 22% peracetic acid, 29.1% acetic acid, 31.5% water, 16% hydrogen peroxide, 1% sulfuric acid.

| Water, g | 225 | 225 | 225 | 225 | 175 | 200 | 200 | 225 |
|---|---|---|---|---|---|---|---|---|
| CH₃COOOH solution | B | B | B | B | B | B | A | B |
| Grams | .058 | .052 | .065 | .065 | .045 | .052 | 0.11 | .058 |
| Emulsifier, g | 0.45 | 0.4 | 0.45 | 0.45 | 0.35 | 0.4 | 0.4 | 0.45 |
| t-Hexadecyl mercaptan, g | .112 | .112 | .084 | .042 | .0056 | .0056 | 0.48 | .0056 |
| Monomers Charged, g.: | | | | | | | | |
| Acrylonitrile | 7 | 4 | 7 | 7 | 3.5 | 3.5 | 2.0 | 3.5 |
| Vinyl Chloride | 3 | 6 | 3 | 3 | 1.5 | 1.5 | 2.75 | 1.5 |
| Vinylidene Chloride | | | | | | | 0.25 | |
| Water:Monomers Ratio | 22.5:1 | 22.5:1 | 22.5:1 | 22.5:1 | 35:1 | 40:1 | 40:1 | 45:1 |
| Conversion: | | | | | | | | |
| Percent | 20.8 | 6.8 | 3.6 | 8.4 | 20.6 | 19.2 | 2.6 | 27.4 |
| Rate Percent Per Hour | 6.25 | 1.4 | 1.8 | 2.4 | 4.85 | 4.27 | 1.5 | 6.09 |
| Reduced Viscosity, I_R | 0.88 | 0.68 | 1.04 | 1.92 | 0.89 | 0.8 | 0.24 | 1.07 |
| Acrylonitrile content, percent | 71 | 50 | 69 | 71 | 71 | 72 | 40 | 72 |
| Color BLT, Initial/Heated | | 89/75 | 95/89 | 94/87 | | | | |

A = 40% peracetic acid, 39% acetic acid, 14% water, 6% hydrogen peroxide, 1% sulfuric acid.
B = 22% peracetic acid, 29.1% acetic acid, 31.5% water, 16% hydrogen peroxide, 1% sulfuric acid.

| Peracetic Acid, Millimoles | Mercaptan | | Conversion | | | Reduced Viscosity, I_R | Color BLT, Initial/Heated |
|---|---|---|---|---|---|---|---|
| | Type | Millimoles | Time, Hrs. | Percent | Rate Percent/Hr. | | |
| 3 | n-C₁₂H₂₅SH | 1 | 2 | 10.0 | 5.0 | 4.1 | 92/74 |
| | | 2 | 2 | 5.6 | 2.8 | 3.4 | 91/73 |
| 3 | t-C₁₂H₂₅SH | 3 | 1 | 3.4 | 3.4 | 2.8 | 90/69 |
| 3 | n-C₁₆H₃₃SH | 1 | 1 | 45 | 45 | 3.3 | 91/75 |
| 3 | t-C₁₆H₃₃SH | 1.4 | 2 | 41 | 21 | 2.4 | 92/71 |
| 4.5 | t-C₁₆H₃₃SH | 1.5 | 1.5 | 17.1 | 11.4 | 2.4 | 93/76 |

*Example 22*

Other peroxides were substituted for peracetic acid to produce terpolymers by following the procedure described in Example 16. Substitution of 1.4 g. of a 30% aqueous solution of hydrogen peroxide for the peracetic acid in Example 16 failed to produce polymer. Similarly, substitution of 0.06 or 0.12 g. portion of t-butyl peroxide for the peracetic acid were also ineffective. In these experiments 0.9 g. of the emulsifier and 0.16 g. of t-hexadecyl mercaptan were used together with the amounts of peroxide indicated. In all instances only a very slight trace of polymer could be observed in the reactor after five hours.

*Example 23*

A series of suspension polymerization was carried out in the manner described in Example 16 to produce the terpolymer. The polymerization charges consisted of 16 g. of acrylonitrile, 22 g. of vinyl chloride, 2 g. of vinylidene chloride, and 200 g. of water. The peracetic acid solution used had the following composition: 40% peracetic acid, 39% acetic acid, 14% water, 6% hydrogen peroxide, and 1% sulfuric acid.

What is claimed is:

1. A catalyst composition consisting essentially of peracetic acid and a water-insoluble, saturated alkyl mercaptan.

2. A catalyst composition consisting essentially of peracetic acid and a water-insoluble, saturated alkyl mercaptan selected from the group consisting of normal and branched chain saturated alkyl mercaptans containing at least 12 carbon atoms.

3. A catalyst comprising consisting essentially of peracetic acid and a water-insoluble, saturated tertiary-alkyl mercaptan containing at least six carbon atoms.

4. A catalyst composition consisting essentially of peracetic acid and tertiary-hexadecyl mercaptan.

References Cited by the Examiner

UNITED STATES PATENTS

| | | | |
|---|---|---|---|
| 2,569,506 | 10/1951 | Vandenberg | 260—88.7 |
| 2,581,402 | 1/1952 | Fryling | 260—88.7 |
| 2,621,170 | 12/1952 | Banes et al. | 260—85.5 |
| 2,718,515 | 9/1955 | Thomas | 260—80.5 |
| 3,006,902 | 10/1961 | Trofimow et al. | 260—80.5 |

TOBIAS E. LEVOW, *Primary Examiner.*